(12) United States Patent
Benitez

(10) Patent No.: US 10,305,930 B2
(45) Date of Patent: May 28, 2019

(54) WIRELESS PORTABLE PERSONAL CYBER-PROTECTION DEVICE

(71) Applicant: Carlos Esteban Benitez, Buenos Aires (AR)

(72) Inventor: Carlos Esteban Benitez, Buenos Aires (AR)

(*) Notice: Subject to any disclaimer, the term of this patent is extended or adjusted under 35 U.S.C. 154(b) by 0 days.

(21) Appl. No.: 15/598,301

(22) Filed: May 17, 2017

(65) Prior Publication Data

US 2018/0097821 A1    Apr. 5, 2018

(30) Foreign Application Priority Data

Sep. 30, 2016  (AR) .............................. 20160103024

(51) Int. Cl.

| | | |
|---|---|---|
| *H04W 4/80* | (2018.01) | |
| *H04L 29/06* | (2006.01) | |
| *G06F 1/3203* | (2019.01) | |
| *H04W 88/02* | (2009.01) | |

(52) U.S. Cl.
CPC .......... *H04L 63/145* (2013.01); *G06F 1/3203* (2013.01); *H04L 63/0263* (2013.01); *H04L 63/1425* (2013.01); *H04W 4/80* (2018.02); *H04W 88/02* (2013.01)

(58) Field of Classification Search
CPC .................................................... H04L 63/145
See application file for complete search history.

(56) References Cited

U.S. PATENT DOCUMENTS

| | | | | |
|---|---|---|---|---|
| 9,485,262 | B1* | 11/2016 | Kahn ................... | H04L 63/1416 |
| 2006/0203815 | A1* | 9/2006 | Couillard ............ | H04L 12/4641 |
| | | | | 370/389 |
| 2012/0291101 | A1* | 11/2012 | Ahlstrom ............ | G06F 21/6218 |
| | | | | 726/4 |
| 2013/0198512 | A1* | 8/2013 | Rubin .................. | H04L 63/0823 |
| | | | | 713/157 |
| 2013/0219457 | A1* | 8/2013 | Touboul ................ | G06F 21/562 |
| | | | | 726/1 |
| 2014/0054691 | A1* | 2/2014 | Yilmaz .............. | H01L 29/66727 |
| | | | | 257/331 |
| 2014/0148205 | A1* | 5/2014 | Grinshpun .............. | H04L 69/16 |
| | | | | 455/466 |
| 2015/0101048 | A1* | 4/2015 | Sridhara ................. | G06F 21/55 |
| | | | | 726/23 |
| 2016/0292464 | A1* | 10/2016 | Alarabi ................. | H04W 12/12 |

* cited by examiner

*Primary Examiner* — Kambiz Zand
*Assistant Examiner* — Thanh H Le
(74) *Attorney, Agent, or Firm* — Defillo & Associates, Inc.; Evelyn A Defillo

(57) ABSTRACT

A wireless, portable, personal, cyber-protection external device is used to protect other mobile user devices from cyber-attacks. The invention described herein is a small, smartphone form factor piece of hardware containing a complete single board computer. Embedded in it there are several peripheral devices for incoming connection from user devices and Internet connection, and for sensing malicious activities over wireless bands. A touch screen display is added for user interaction. A complete software solution is added to the device and to a central administration server. The combination of software and hardware is designed to capture, analyze, forward, block network packets and alert the user about in progress cyber-attacks targeting their wireless devices. Moreover, surface attack is reduced to a minimum by design in order to limit cyber-attack risks onto the cyber-protection device itself.

6 Claims, 11 Drawing Sheets

WIRELESS PORTABLE PERSONAL CYBER-PROTECTION DEVICE

FIELD OF THE INVENTION

The present invention generally relates to the field of Cyber-security, and specifically to a portable electronic apparatus, methods and computer programs products for providing agent-less cyber-protection to wireless networks connected personal mobile devices.

PRIOR REFERENCES

[Barnickel et al., 2012] Barnickel, J., Wang, J., and Meyer, U. (2012). Implementing an attack on bluetooth 2.1+ secure simple pairing in passkey entry mode. In Trust, Security and Privacy in Computing and Communications (TrustCom), 2012 IEEE 11th International Conference on, pages 17-24. IEEE.

[Bass and Robichaux, 2001] Bass, T. and Robichaux, R. (2001). Defense-in-depth revisited: qualitative risk analysis methodology for complex network-centric operations. In Military Communications Conference, 2001. MILCOM 2001. Communications for Network-Centric Operations: Creating the Information Force. IEEE, volume 1, pages 64-70. IEEE.

[Jakobsson and Wetzel, 2001] Jakobsson, M. and Wetzel, S. (2001). Security weaknesses in bluetooth. In Topics in Cryptology-CT-RSA 2001, pages 176-191. Springer.

[Lau et al., 2013] Lau, B., Jang, Y., Song, C., Wang, T., Chung, P., and Royal, P. (2013). Mactans: Injecting malware into ios devices via malicious chargers. Proceedings of Black Hat USA.

[National-Security-Agency, 2015] National-Security-Agency (Retrieved December 2015). Defense in depth a practical strategy for achieving information assurance in todays highly networked environments.

[Semiconductors, 2002] Semiconductors, P. (2002). Usb on-the-go: A tutorial. White Paper, January, 9.

[Song et al., 2010] Song, Y., Yang, C., and Gu, G. (2010). Who is peeping at your passwords at starbucks?—to catch an evil twin access point. In Dependable Systems and Networks (DSN), 2010 IEEE/IFIP International Conference on, pages 323-332. IEEE.

[Talbot et al., 2010] Talbot, E. B., Frincke, D., and Bishop, M. (2010). Demythifying cybersecurity. Security & Privacy, IEEE, 8(3):56-59.

[Turnbull, 2005] Turnbull, J. (2005). Hardening Linux. Apress.

BACKGROUND OF THE INVENTION

In early days of computers, user devices used to be physically connected to their main frames or networks and the only way to perform cyber-attacks on those environments was if the attacker had a physical connection. In the present era, user has multiple devices on her own, being connected by all sort of wireless mechanisms and being all part of the same global network, that is Internet itself. All those mobile devices are susceptible to be attacked, infected or compromised and in almost all cases there is no need for the attacker to be physically connected.

In corporate environments one of the most well accepted cyber-defense architectures is the multi-layer approach as defined in Defense-in-depth concept. Enterprise networks use to have a great number of cyber-protection mechanisms like firewalls, proxies, web-filtering, anti-malware, IDS/IPS, etc., all of them installed in dedicated servers and separately managed based on the multi-layer cyber-defense architecture. This provides a complete cyber-protection mechanism to all devices connected to these networks, even mobile ones.

Nevertheless, as mobile devices used to be connected to different networks, they are not protected outside corporate networks. In the case of personal cyber-protection, the common technical approach to the solution is to install almost the same corporative components but with less functions and inside the protected device. This means that people use to install different kind of protection software, like anti-viruses or personal firewalls, on their mobile devices. Some of them also use to configure their devices with cyber-security countermeasures like erasing all the device memory if someone writes the wrong password more than 10 consecutive times. Nevertheless, many device owners also use to install non-trusted software from non-well-verified repositories increasing the risk of cyber-infections. Moreover, many of them use to compromise their own mobile devices using "jailbreaking"[1] or "rooting"[2] techniques, granting administrator privileges to this software making them unsafe or even risky. In their article, Bass and Robichaux explain that one of the main cyber-security flaws is the user behavior. Talbot et al. explains how wireless technologies increases cyber-insecurities.

[1] Jailbreak: Obtain administrator privileges and full access to Apple IOS operating system functions of devices like iPod, iPad or iPhone.
[2] Root: Obtain administrator privileges and full access to Android operating system function of Android devices.

In this scenario, the above mentioned protection countermeasures are rather effectiveness because if a malware is able to take control of the mobile device, the installed countermeasures may be completely invalidated by this malicious software. Normally users are unaware of these cyber-risks and many times want to install games or software applications that they do not know their security or confidence level. For this reason, from the cyber-security point of view, it is very hard to avoid that the device owner misuse their mobile devices.

A reasonable solution for this problem is that the user carries a second device, but specifically designed and built to mitigate cyber-risks. Nowadays, a popular multi-layer, small-scale approach is that named UTM[3]. UTM devices are special pieces of hardware which add a lot of cyber-countermeasures to protect user devices but in a separate box and with no other functionality that cyber-protection, so the users are not tempted to accidentally compromise its security.

[3] UTM: Unified Threat Modules

UTM devices proved to be pretty reliable and their maturity levels have been increasing year by year. State of the art UTMs combines the following main cyber-security features:

Firewall
VPN (Virtual Private Networks)
IDS/IPS (Intrusion Detection/Prevention Systems)
Anti-virus/Anti-spyware/Anti-malware
Web Content Filtering
Anti-spam
Application Control
DLP (Data Leak Prevention)
SSL inspection
NAC (Network Access Control)

UTM devices increase user protection; nevertheless they have two main disadvantages. The first one is that they are not designed to be portable, so they can only be used inside the networks they have been installed on. The second one is that they are so complete and have so many and sophisticated options that they are not suitable to be managed by the common, non-technical user.

In the last years, a number of methods, devices and/or apparatuses have been patented or are even commercially available with the aim of solving this particular mobile cyber-security problem. In fact, this invention relates to US20140090046, U.S. Ser. Nos. 00/921,0682, 00/897,3151, 00/884,4032, 00/884,4036, 00/862,7452, 00/859,5834, 00/850,5103, 00/837,0922, 00/837,0918, 00/831,6438 and 00/748,6666. Nevertheless these prior art developments have three main disadvantages explained as follows.

In these days, users work with many portable devices at the same time (one or more smartphones, tablets, notebooks, smart watches, Bluetooth beacons, etc.), all of them connected wirelessly and therefore, all of them susceptible to cyber-attacks.

The first disadvantage is that one of prior art is that though some of these apparatuses are portable, they still need physical cable connection with the mobile device to be protected. In this scenario, the amount of mobile devices connected to these kind of cyber-protection apparatuses is limited to the amount of available physical interface connectors. In FIG. 1 and FIG. 2 some of prior art devices functions are summarized. As it can be seen, hardwired connections go from mobile devices 100 to the prior art protection device 200. UTM functions are included in both type of prior art devices 202 and 212. Moreover, some of them need to be plugged in power wall plates 301 to work. Some of them have only small batteries to preserve power for controlled boot down in case of power loss 302

The second disadvantage is that as almost all prior art developed apparatuses contain a number of TCPIP or UDP/IP system services listening over the network like DHCP, DNS, web-based Administration applications, etc. 215. This means that their attack surface is the same that for every other network protection device. So, if an attacker is inside the network and knows the IP address of some of these prior art protection devices, it is possible for her to generate exploit attempts over some of these services vulnerabilities.

The third one is that many of these prior art protection devices also need some kind of software agent 111 installed inside the mobile device to be protected. This makes the protection non-completely transparent to the user because it adds an additional complexity level, so she can feel uncomfortable with it.

Finally, many of these prior art devices FIG. 2 were designed with the only purpose that users can use Internet with a certain increase on the security level at hotels when they are traveling.

OBJECTS OF THE INVENTION

As it was already stated, in the case of personal cyber-protection, the usual solution is to install the same corporative cyber-protection components but inside the protected device itself.

This provides a certain level of cyber-protection but this architecture has a main vulnerability: if for any reason a malware manages to get inside the device, "all" the cyber-protection components may become compromised.

This is where the above mentioned multi-layer or Defense-in-depth approach arises. As in the prior art, some protection mechanisms must be added "outside" the user device in order for the cyber-protection device to remain uncompromised in the case a cyber-attack is successful.

This is clear in corporate environments but it is not so obvious in personal ones as it was mentioned before. This is not due to technical considerations but human: people use to fail in two main cyber-security concepts. The first one is that they usually believe that they have no valuable information inside their personal devices so, they will never be target of an cyber-attack. And the second one is that they also like to get more "use" of their mobile devices, so they apply "jailbreak" or "root" techniques to their mobile devices or install software from untrusted sources making them much more unsafe.

That is why is also Important to use some kind of external and transparent or non-invasive cyber-protection mechanism in order to leave the user free to configure her own mobile devices as she wish. If it is accepted that the user will compromise their mobile devices, the cyber-protection device should not only be hardened and secured but also should have the minimum possible attack surface by design. And at last, it would also be much better for the user not to be aware of administrative tasks of this second cyber-protection device.

SUMMARY OF THE INVENTION

Described herein there are an electronic portable apparatus, methods and computer programs for providing together agent-less cyber-protection to personal final user mobile devices. The apparatus may be referred as "Wireless portable personal cyber-protection device" or simply "cyber-protection device".

The present invention relates to cyber-security field and in particular to wireless mobile security. Its purpose is to help the final user to securely use their own wireless connected devices by means of a specific purpose device or apparatus, hereafter named "cyber-protection device", which is able to detect some potentially dangerous user actions or attackers or intruders and to trigger actions like blocking certain activities at application of network level, or warning her about its potential danger.

The invention embodiment that can be seen in FIG. 3 the system includes a portable cyber-protection device 400 that provides a secure use for the user's other mobile devices. In the invention embodiment, the apparatus has a form factor of a smartphone and also includes a smartphone size rechargeable battery power source. In the invention embodiment the apparatus includes two IEEE 802.11 WiFi wireless interfaces, one to act as Access Point for the user' mobile devices and the other to act as client in order to connect the apparatus to another Access Point that can be used for Internet or LAN connections. The cyber-protection device 400 will also include a third IEEE 802.11 wireless interface used to sniff the packets over the air in the IEEE 802.11 WiFi bands with the purpose of analyzing them and detect any kind of WiFi cyber-attack attempts. The device may include a Bluetooth interface with the purpose of analyzing Bluetooth band and detect any kind of Bluetooth cyber-attack attempt. The device may include a ZigBee (IEEE 802.15.4) interface with the purpose of analyzing Internet of Things ZigBee band and detect any kind of ZigBee cyber-attack attempts. The device may include a BAN (IEEE 802.15.6) interface with the purpose of analyzing Wireless Body Area Network band and detect any kind of user BAN wearable cyber-attack attempts.

The apparatus includes a first USB charging connector in order to be connected to an energy power source which will charge the apparatus' battery. The Power Management Module 408 is in charge of managing the power charge of the battery and the power consumption of the apparatus.

The device may also include a second USB interface managed by the USB OTG Module 406 but only for the purpose of detecting untrusted malicious power chargers infected with malware which can infect some mobile devices only by connecting them to the fake power charger.

The apparatus explicitly does not have Ethernet interfaces. The apparatus explicitly does not have serial console interfaces. The apparatus explicitly does not have JTAG interfaces. The apparatus explicitly does not have any other interface that can be used to directly access the core system.

The apparatus has a built in touch screen display 407 so the user can interact with some of the cyber-protection device 400 functions. In order to reduce the cyber-protection device 400 attack surface, it will not have any TCP/IP or UDP/IP listening service. Regarding this, the only way for the user to interact with the device while in Normal Mode, will be the touch screen display 407. The apparatus also has a built in sound system to trigger some alarm or warning actions. The apparatus may also have a digital fingerprint scanner in order to authenticate the user to perform configuration tasks.

The apparatus provides cyber-protection to other user mobile devices in two different ways. The first one is to act as gateway between user mobile devices and the actual WiFi Internet connection. The second one is by using different malicious cyber-activities detectors warning the user about them and providing tips to avoid or minimize the cyber-risks.

In normal use, the user initially powers-up the apparatus, and after authenticating, she has to pair each one of her mobile devices to the apparatus embedded Access Point in the same way she would do when she connects to any other external WiFi Access Point. A randomly generated strong password may be presented on the apparatus screen display so the user can authenticate to the apparatus WiFi Access Point. After that, a list of available WiFi networks is presented on the apparatus screen so she can configure the WiFi access connection to a LAN network or to Internet. All these functions are performed by the Connection Module 401. The cyber-protection device 400 WiFi networks are configured in bridged mode. In this way, no DHCP or DNS servers are running on it, so IP addresses, Default Gateway and DNS Servers configurations are mirrored from the outside WiFi Access Point to each user mobile device.

All the user mobile devices traffic goes trough the apparatus Bridge Module 402 so all the traffic traveling through them is sniffed and analyzed. Policies can prevent some well-known cyber-attacks blocking some sort of TCP/IP or UDP/IP connections but at WiFi link layer. Transferred files can be analyzed with an antivirus and block its transmission too provided the file to transfer contains a known virus. As all the traffic (plain and encrypted) is analyzed, potentially dangerous traffic can be detected by an intrusion detection system and warn the user about a potential intrusion.

Besides TCP/IP/IP or UDP/IP over WiFi traffic analysis, the cyber-protection device 400 also performs scanning of other radio protocols like Bluetooth, ZigBee IEEE 802.15.4 and BAN 802.15.6 in search of cyber-attack attempts by means of the Radio Threat Scanning Module 405. Provided some sort of cyber-attack attempt is detected, the user is warned by means of an on-screen alert and a sound.

Cyber-protection device software update and upgrade is done by means of a central server from which updates, upgrades and policies are downloaded. In order to strengthen cyber-protection device 400 security, each apparatus is loaded with an unique digital certificate that authenticates to the central server software. An Admin Client Module 409 is in charge of connecting to the central server 160. In order to perform cyber-protection device 400 maintenance, an SSH tunnel can be opened from the device to the central server so it can run an SSH client and perform administrative tasks.

In corporate environments, final users should not interact with the administration software and this task would be performed by the network administrator as it would be another MDM[4] software. Policies, alerts, antivirus or IDS signature updates should be controlled by the enterprise network administrator.

[4] MDM: Mobile Device Management.

Provided the cyber-protection device 400 will be used only by personal use, the central administration software may be installed in another computer owned by the user, which may not be protected by this mechanism. Another alternative may be to have a SaaS administration service on the cloud with very simple wizards. A third option may be not to use an update server and configure the cyber-protection device 400 from the touch screen display 407 to perform its updates directly from the original Internet servers that provides updates; that is: software from the cyber-protection device 400 developers' website.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
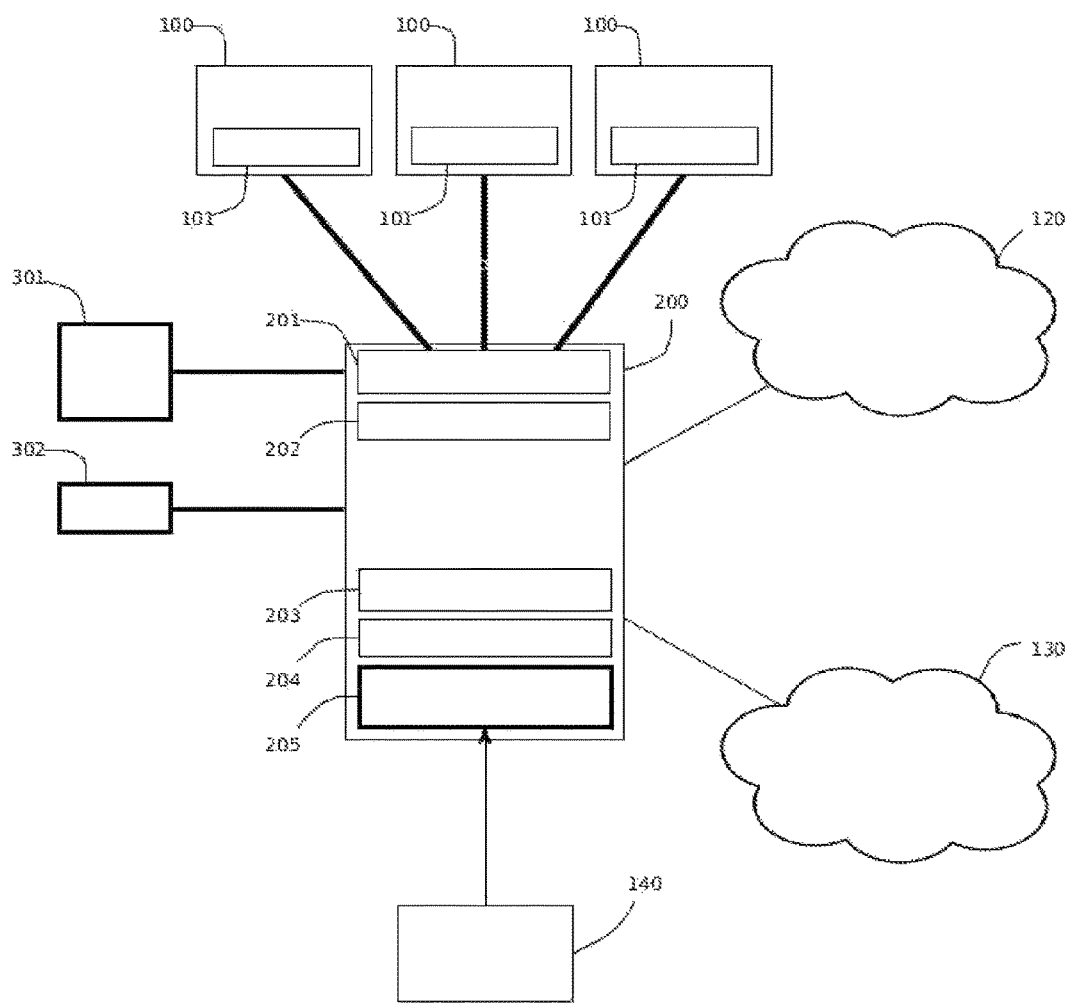
FIG. 1 depicts a simplified block diagram of some designs of prior art related to cyber-protection devices.
Figure 2:
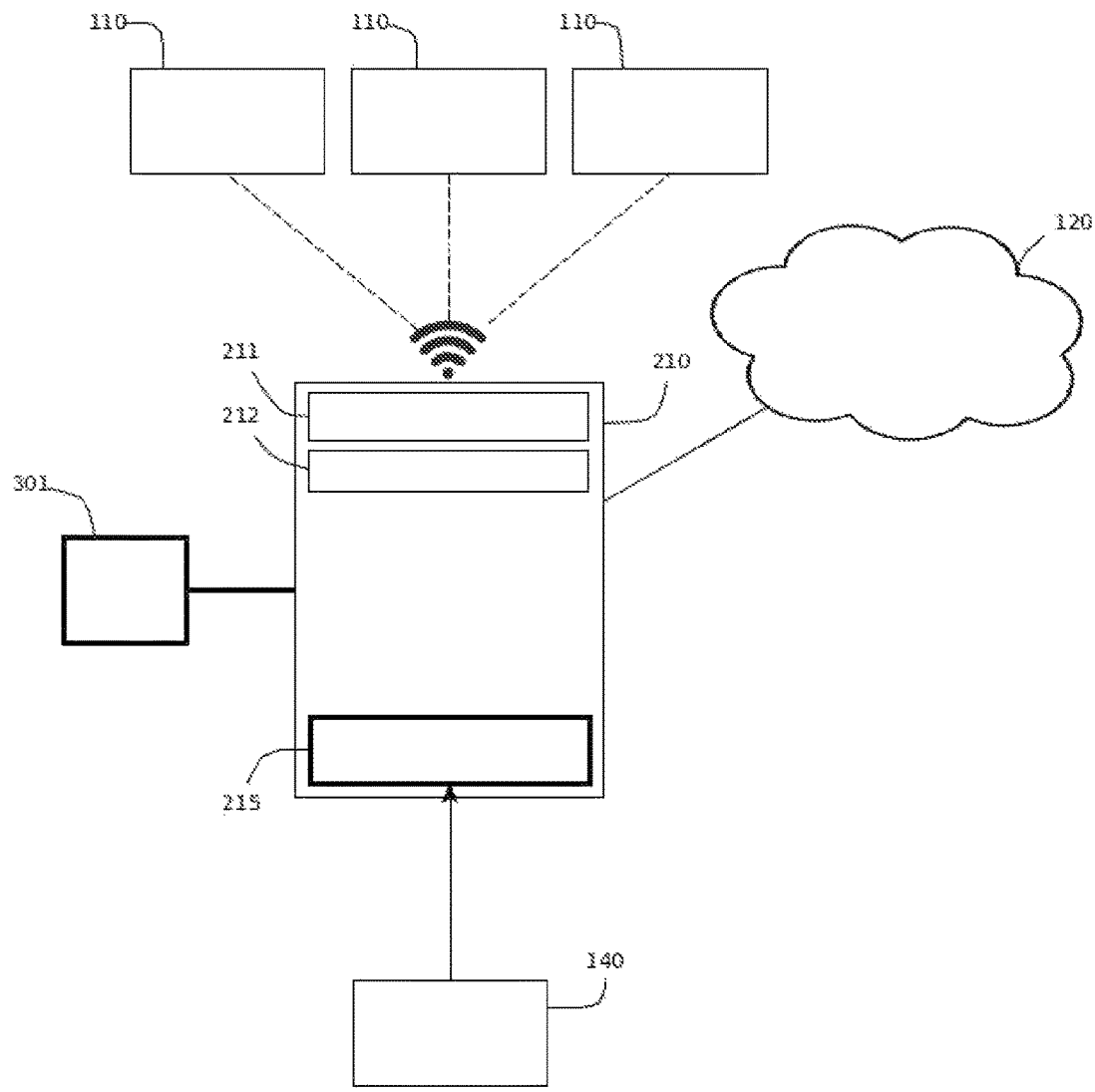
FIG. 2 depicts a simplified block diagram of other development designs of prior art related to cyber-protection devices.
Figure 3:
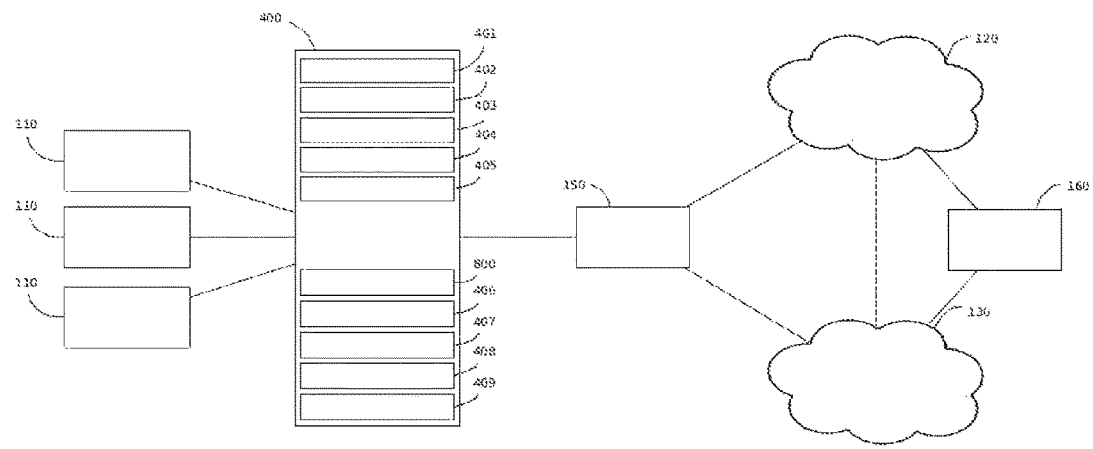
FIG. 3 is the block diagram of the invention general description.

In FIG. 3 the invention embodiment and its use can be seen. The cyber-protection device 400 has a number of built in modules used for different purposes that are explained as follows.

Figure 4:
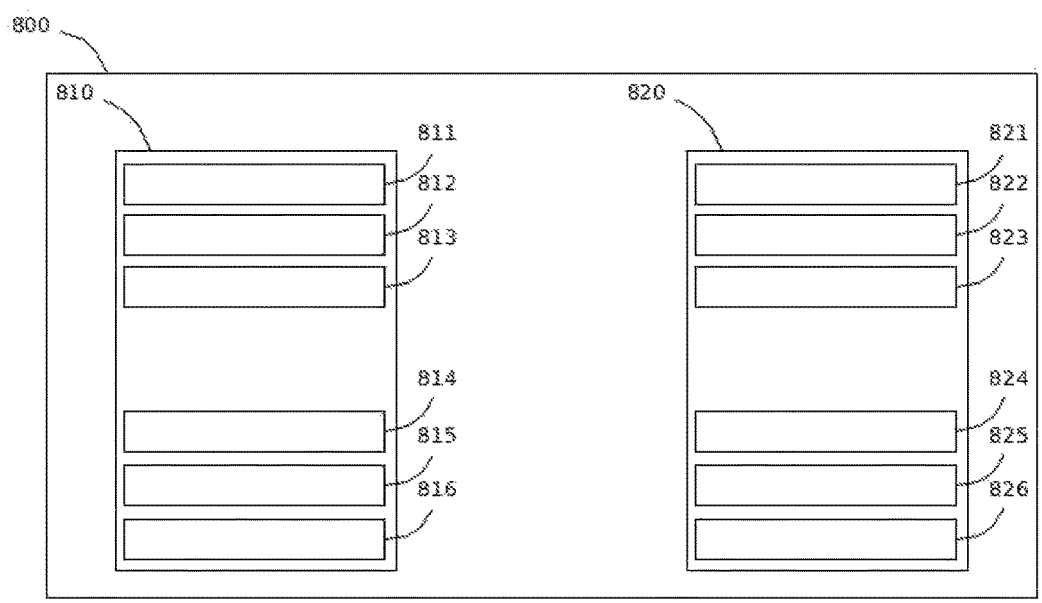
FIG. 4 is the block diagram of the Single Board Computer Core System.

In the preferred embodiment, the cyber-protection device is based on the Core System shown in FIG. 4. The proposed hardware is to be based in very small board full functional computers designed to be used for portable mobile purposes. Those boards can be built with a number of hardware requirements needed to run open source operating systems like Linux. Core System 800 can be divided in Core System Hardware 810 and Core System Software 820.

Core System Hardware 810 can contain the same components than any other mobile device hardware. SoC (system-on-chip) systems can be used for this purpose. An ARM architecture processor can be used as the main CPU 845 because of its low cost, low power consumption and high performance. Using SoC models, many modules can be integrated on the adopted chip as follows. Input/Output module 811 will manage connections between Core System and peripherals. Micro Controller Unit 812 will be in charge of controlling all the peripherals. Graphic Processing Unit 813 will do the 2D or 3D graphic processing. Central Processing Unit 814 will execute the machine code instructions. Memory can be divided in System Memory 815 where basic booting programs can be stored and User Memory 816 where operating system and applications can reside.

Core System Software 820 resides in System 815 and User Memory 816 and contains all the usual components of an operating system. Kernel module 821 is in charge of connecting the user and applications with the hardware. Linux based operating systems can be used for this purpose. As ARM architecture is selected for the preferred embodiment, some versions of ARM architecture Linux flavors exists and can be used. Application Program Interface 822 is used as abstraction layer between the kernel and the user programs. Hardware device module 825 manages input and output devices by means of Device Drivers 824. A File system 823 is created in order to manage operating system and user files. Please notice that in case of the cyber-protection device, actions on the user interface will be played by a higher abstraction layer, that is: the cyber-protection device Application itself.

Figure 5:
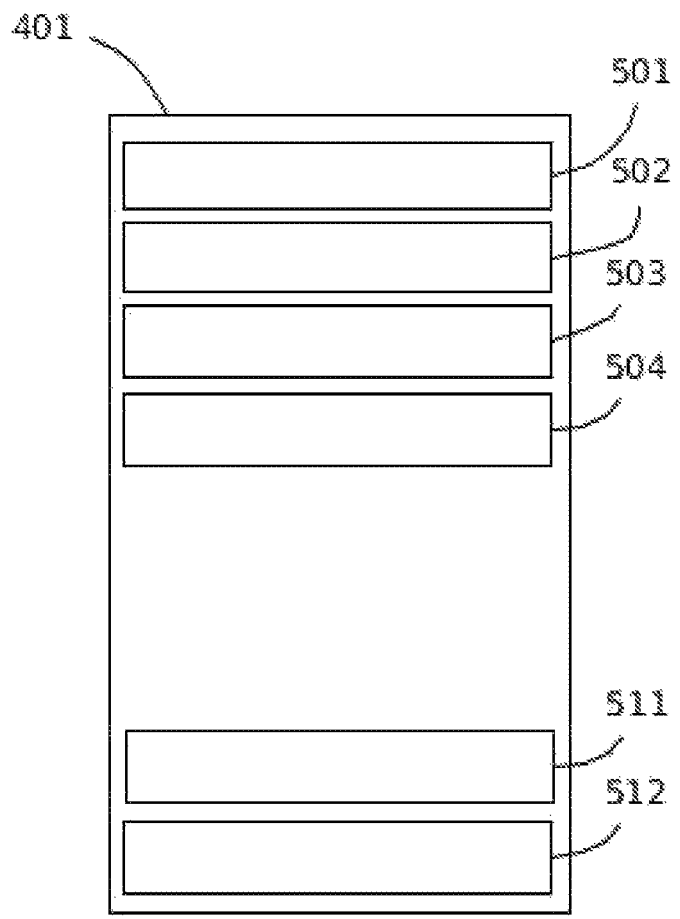
FIG. 5 is the block diagram of the Connection Module.
Figure 6:
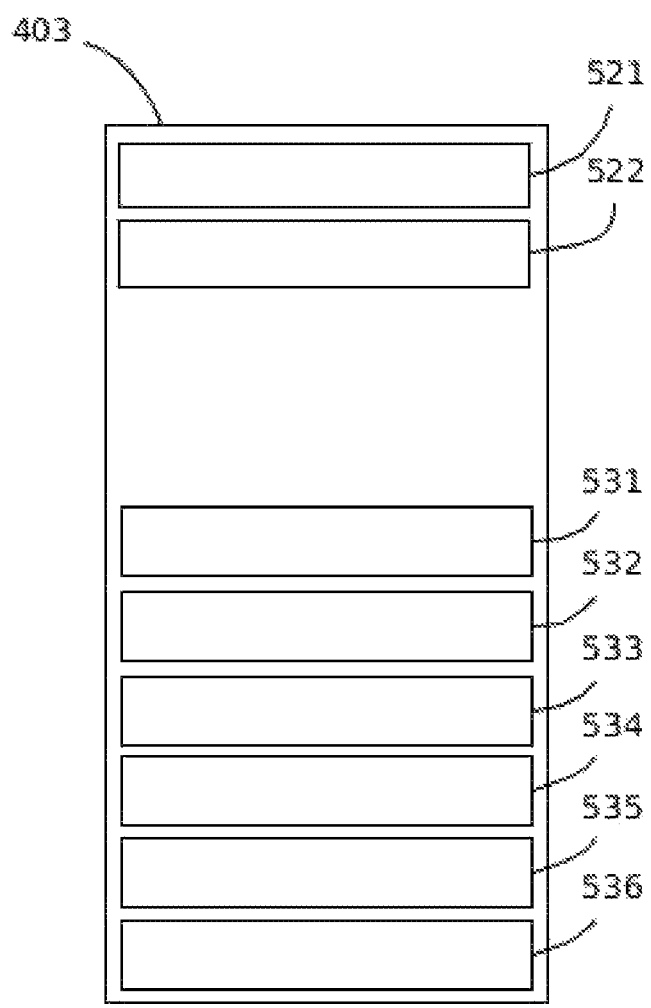
FIG. 6 is the block diagram of the Deep Packet Inspection Module.
Figure 7:
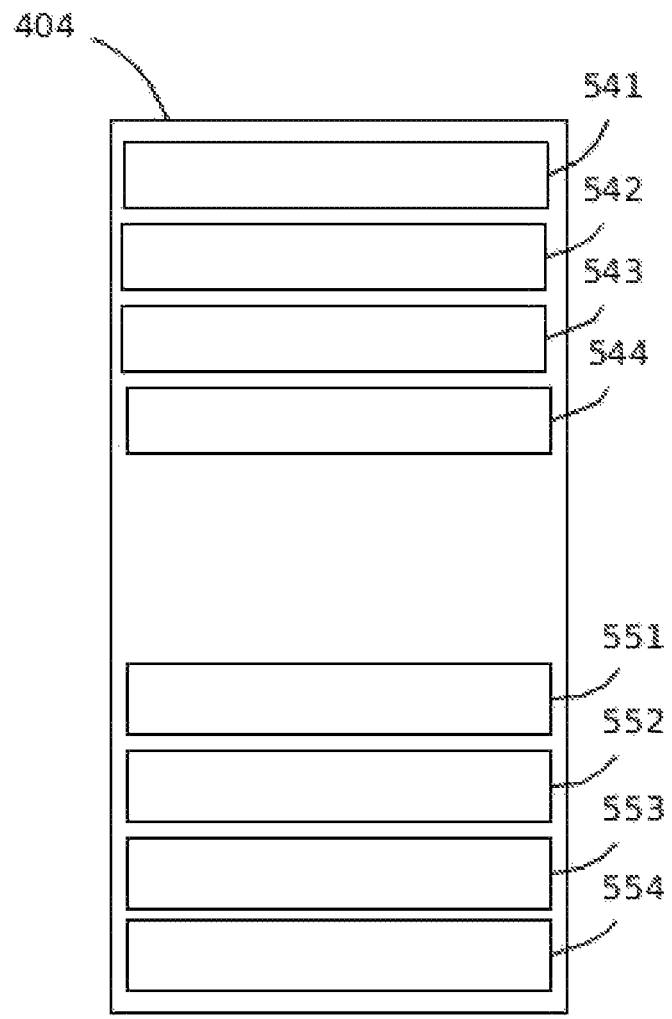
FIG. 7 is the block diagram of the Security Module.
Figure 8:
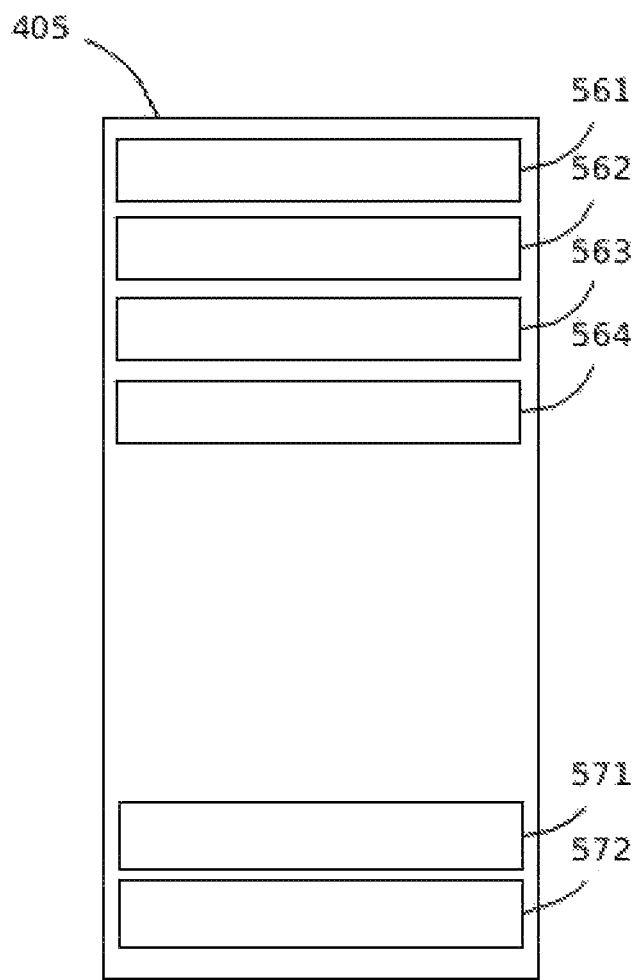
FIG. 8 is the block diagram of the Radio Threat Scanning Module.

The connection module 401 has two parts, one acting as server and one acting as client. FIG. 5 shows connection module sub-modules.

As server, this sub-module acts as a an Access Point in order to connect user mobile devices 110. The WiFi device 501 is configured as WiFi Access Point listening interface for the connection of other mobile devices and is used exclusively for this purpose. Access point open source software 502 like hostapd can be used to perform this task. Connection from the cyber-protection device 400 to other Access Points 150 is made with the 503 WiFi client interface that will be used exclusively for this purpose.

Acting as client, the cyber-protection device connects 400 to Internet 120 or Intranet 130 connected WiFi external Access Points 150. A WiFi client open source software 504 like wpa_supplicant can be used to perform this task.

Connection sub-modules can be activated or deactivated regarding the cyber-protection device 400 configured working mode. These modes are Normal Mode (511 sub-module is activated) and Administrator Mode (512 sub-module is activated). Working modes will be explained later.

Network packets generated on user mobile devices 110 are forwarded to external Access Points 150 through the bridge module 402 as well as network packets returning from the destination servers reaching the WiFI Access Point 150 towards the user mobile devices 110 through the bridge module 402 but in reverse direction. The use of bridged mode allows to avoid setting IP addresses to the WiFi network interface devices and in this way, avoids unnecessary increase of the attack surface on the cyber-protection device 400 itself.

In this embodiment, all network traffic (encrypted an unencrypted) is transparently redirected from the user mobile devices to the destination servers on Internet 120 or Intranet 130 allowing the device kernel modules to inspect, analyze, take actions according to the network traffic content. Unencrypted network traffic information passing across the bridge module, is directly sent to be analyzed by the Security Module 404.

In this scheme, encrypted traffic is forwarded but cannot be inspected. So, DPI (Deep Packet Inspection) module 403 is added in order to inspect encrypted traffic. As encrypted traffic depends on the communication protocol that implements the encryption, one solution that can be used to inspect its traffic is using one different proxy for each protocol to be analyzed using the same techniques used in MITM (man-in-the-middle) attacks.

Some proxy sub-modules included in the present invention can be one or more of the following ones. HTTPS traffic is intercepted by means of a proxy through a HTTPS sub-module 531 with some existing open source tools like mitmproxy, SSL-mitm, squid-in-the-middle or others. SSH and SFTP protocol communications is also intercepted by means of a SSH proxy module 532, implemented for example by mitmproxy. Other non-HTTP protocols like NAPS, POP3S and SMTPS are intercepted and decrypted for inspection by means of NAPS sub-module 533, POP3S sub-module 534 and SMTPS sub-module 535. This can be done with known open source tools like sslstrip.

Once DPI proxy sub-modules extracts and decrypts encrypted network traffic, Analysis Sub-module 536 performs analysis and triggers actions based on security rules like blocking connections on the firewall or alerting the user. Both rule-sets reside on the security module 404.

Security module 404 may include a number of UTM-like sub-modules in order to take actions based on the analysis performed on the deep packet inspected data. One of these sub-modules is a firewall engine 541 in which actions are performed based on the firewall rules engine 542.

An IDS (Intrusion Detection System) sub-module 551 analyses all the packets captured by the DPI 403 module if the traffic is encrypted or the Bridge Module 402 in case it is not and send alerts to the alert engine sub-module 543. IDS sub-module can be implemented by means of well known open source tools like snort or suricata.

Antivirus sub-module 552 can also be included inside the cyber-protection device using open source tools like Clam-Av, Avast, AVG, Sophos, etc. or commercial ones like AVG, ESET, F-Secure, Kaspersky, Panda, F-Prot, etc.

Antispam engine sub-module 553 like SpamAssassin acting as email proxy may be added to this module too, in order to stop SPAM emails reaching the email clients on the user mobile devices.

Content filter sub-module 554 may be added for URL or HTTP payload based filtering. Known tools like open source e2guardian or commercial ones like safe squid can be used for this purpose.

Taking into account that cyber-attacks to user wireless devices can be done on several ways and with several technologies, the invention described here adds a Radio Threat Scanning Module 405. The purpose of this module is to scan mobile devices radio frequencies in order to detect cyber-attack attempts to these devices. The module 405 adds a number of sub-modules to scan each wireless technology for cyber-attack attempts.

A third WiFi interface device 561 is included in order to detect anomalies over the air of different WiFi access points or clients located on the other user mobile devices neighborhood. In this way some software can be developed for example in order to detect illegal deauth packets that can perform DoS (Denial of Services) cyber-attacks to established user devices connections. Evil twin attacks can also be detected with simple software applications that detect multiple Access Points with the same network name or SSID.

Some other wireless interface devices are included like Bluetooth 562, IEEE 802.15.4 (ZigBee) 563 and IEEE 802.15.6 (BAN) 564 in order to detect anomalies over the air for all these protocols.

All these sub-module devices are integrated with the Radio IDS Engine 571 which is in charge of running the algorithms that detects anomalies or known cyber-attacks. This sub-module transfers information to the Radio Alert sub-module 572 which alerts the user on the screen display about potential or in-progress wireless cyber-attacks.

USB OTG module 406 can be used for two purposes. The first one is to check for public power chargers in order to verify if they are valid or fake and if they attempt to infect user devices when she plug them. The second one will be to use the device as external boot media in case some of the user mobile devices are broken and repairing is needed by booting them from eternal pen drives. In this case, the personal cyber-protection device will act as an external USB memory for boot the other device.

Figure 9:
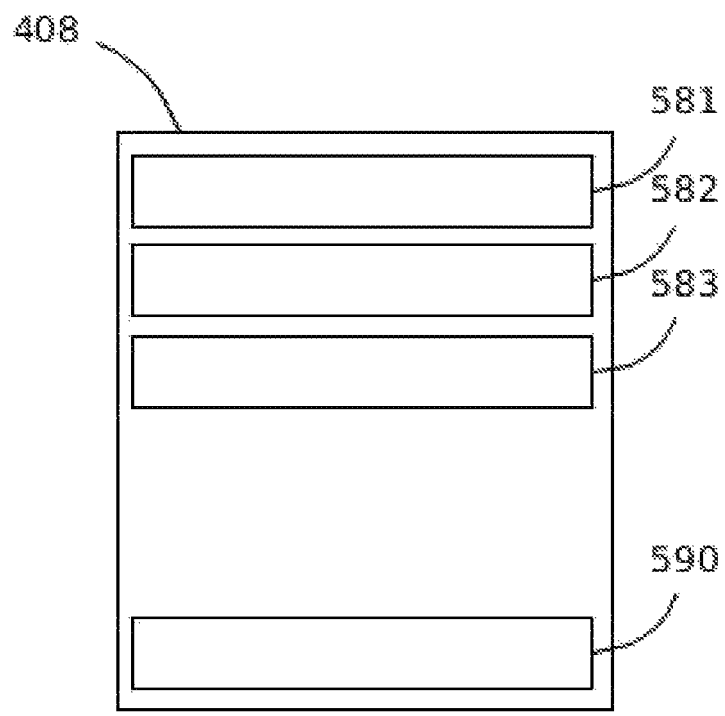
FIG. 9 is the block diagram of the Power Management Module.

Power Management Module FIG. 9 is added in order to manage power from the battery so the device can work several hours without being charged. It includes a Battery charger sub-module 581 which provides voltage regulation and battery charging circuits. A power manager 590 manages the power consumption of the whole device. This management includes two of the main power consumption devices described as follows.

The Display module power management 582 manages the power consumption of the user display touch screen so it can activate the screen saver after a certain time defined by the user. It also includes a brightness control so the user can adjust it and avoid unnecessary power consumption.

The second control sub-module is the Wireless power management 583. As three WiFi devices 501, 503 and 561, are included in the cyber-protection device 400, power saving is needed to avoid a fast battery power drain. As the cyber-protection device 400 will be used very near to the user mobile devices, that is a few meters, Access point device 501 needs minimum power to interact with them. Wireless power management 583 adjusts its power to the minimum necessary to achieve the bandwidth of the connected network. The same feature is designed for the Wireless client device 503 but, as this device should be connected to the external Access Point and this can be farther, its power could be higher than Access point device 501. Finally, the WiFi sub-module device 561 is used only as receiver, so the power can be adjusted to a minimum.

Power supply is also controlled on the other radio scanning sub-modules like Bluetooth 562, ZigBee 563 and BAN 564. All these power management functions are performed by the Power Manager sub-module software 590.

In order to lower cyber-protection device 400 attack surface, no network listening software is included into it. Configuration is done through user interaction with the Touch Screen Display 407. In the preferred embodiment, the local administration software can be as simple or as complex as it is defined by design. The minimum configuration may include external Access Point browser and connection screen. In the maximum configuration, local administration software can be built to set and modify every single system parameter. In this embodiment, different access profiles can be included so access to more dangerous parameters needs higher profile access. If minimum configuration is chosen, a safe remote configuration scheme can be added. In this case, two operation modes are designed as follows.

Figure 10:
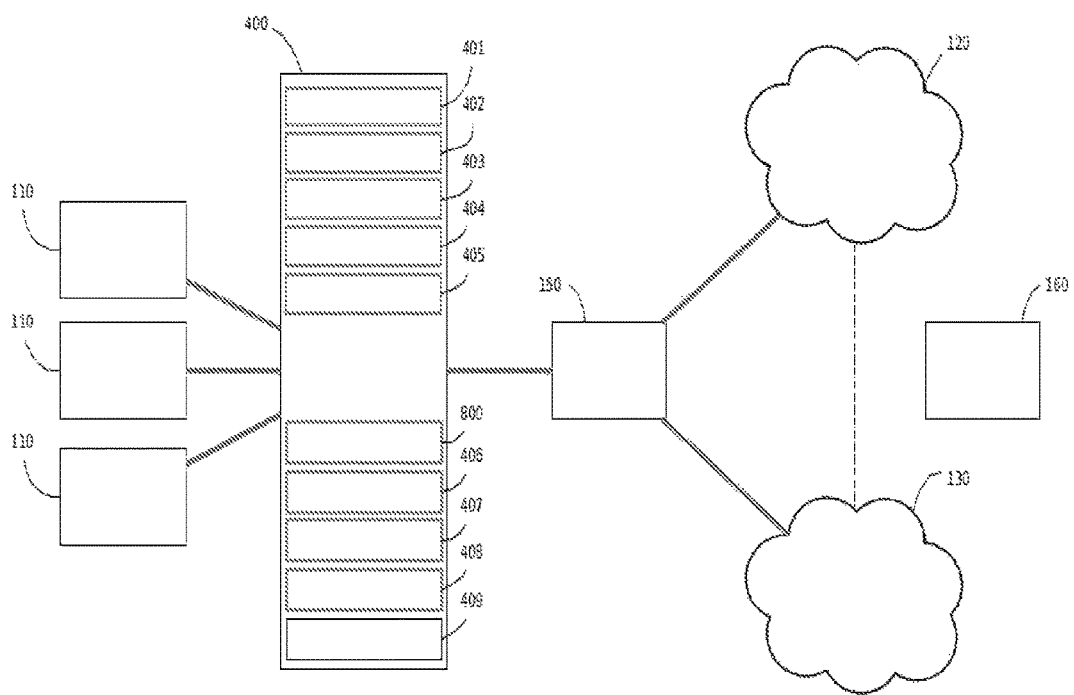
FIG. 10 is the block diagram of the invention working in Normal Mode.

Once the user powers-on the cyber-protection device 400, it starts showing in the Touch Screen Display 407 a login screen. Once logged-in, some minimal functions are showed to the user. The first one may be to start the cyber-protection device 400 into the Normal Mode FIG. 10.

In Normal mode, the first function is the Access Point mode configuration that enables the cyber-protection device 400 to act as Access Point for the other user mobile devices 110. The other function is the External Access Point browser. This allows the user to browse and connect to external (Internet 120 or Intranet 130) Access Points 150. Once both connections are established the Bridge Module 402 connects user mobile devices 110 to the networks by means of external DHCP services running on external WiFi Access Points 150.

Once the connections are established, user connects to Internet 120 or Intranet 130 transparently except in case it uses external encrypted services like HTTPS, SSH, SFTP, NAPS, POP3S, SMTPS, etc. As DPI module 403 is enabled by default, cyber-protection device 400 needs to use its own digital certificate to decrypt and encrypt traffic and therefore, inspect packets for potential cyber-attacks.

These certificates are locally created with the Certificate Generator sub-module 521 and stored in the Certificate Store 522. As the user access any encrypted service, the client inside the user mobile devices should detect that the certificate is invalid and warns the user about it. To avoid this issue, user mobile devices must have the cyber-protection device root certificate installed. This installation must be performed in a secure way during the pairing process between the user mobile devices and the cyber-protection apparatus. The main advantage of this method is that an external device decrypts an re-encrypts packets, but this external device belongs to the same user so reducing data lost or steal risks.

Once all initial settings are completed, user access network services and DPI module 403 analyzes all network traffic. By default, Security module 404 is active blocking unwanted traffic by means of the Firewall sub-module 541, the Antispam sub-module 553 or the Content filter sub-module 554, or alerting the user about potential danger by means of the Alert sub-module 543. Antivirus sub-module 552 is also used to alert the user about detected viruses.

USB OTG module 406 is also enabled in order to detect malicious power chargers. It works by detecting data coming from power chargers once it is plugged to them and alerting the user on the Touch Screen display 407.

Admin Client module is completely disabled when the cyber-protection device 400 is set in Normal Mode. This would prevent that if some user mobile device gets compromised, and if the Admin Mode is working at the same time, the attacker may have the possibility of accessing either the cyber-protection device 400 or the Remote Admin Software 160.

Figure 11:
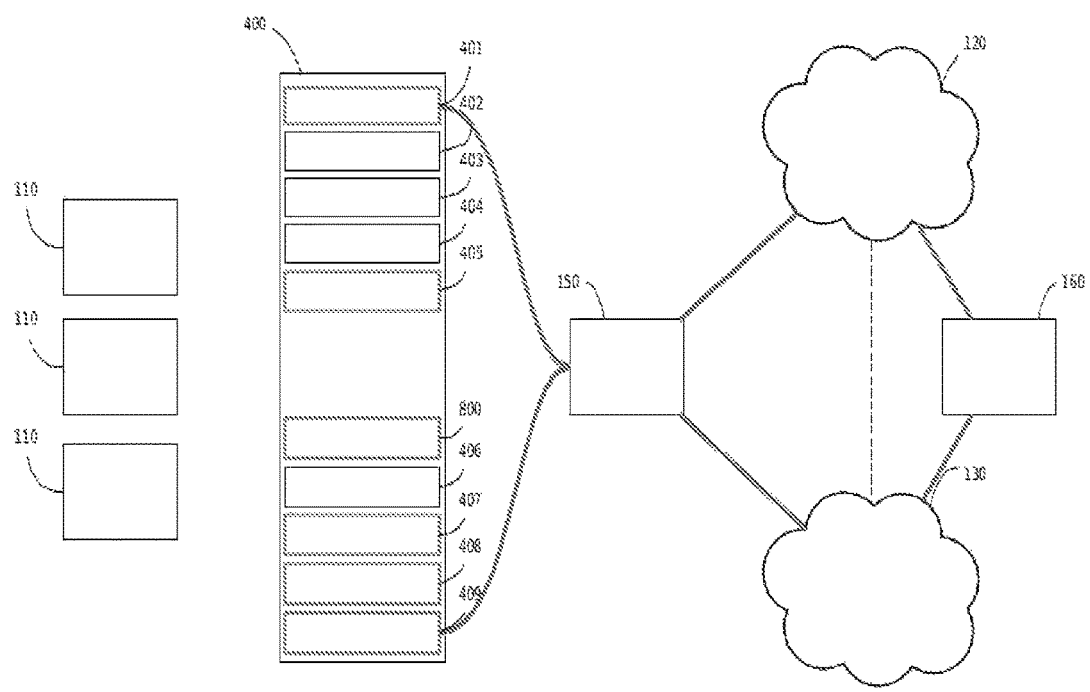
FIG. 11 is the block diagram of the invention working in Administrator Mode.

If the Remote Admin Mode is enabled FIG. 11, the cyber-protection device 400 can be configured remotely from an Admin Software that can be accessed over the network. As this function accesses remotely the cyber-protection device 400 configuration, if Admin Mode is enabled Normal Mode functions should be disabled. FIG. 11 shows this scenario.

In this case, modules Bridge 402, DPI 403, Security 404 and USB OTG 406 are disabled because sub-module Wireless Client device 503 inside Connection module 401 acts as network client having IP address so it can connect remote Admin Software 160. Admin Client software 409 connects to an Admin software server 160 in order to obtain configurations for the cyber-protection device 400. Admin software server 160 should be accessed by administrator and configure the cyber-protection device 400 in the same way than an MDM[5] software. Policies, alerts, antivirus or IDS signature updates sent to the cyber-protection device 400 should be controlled by the administrator.

5 MDM: Mobile Device Management.

In corporate environments the cyber-protection device 400 should be managed by the enterprise network manager accessing an advanced version of the Admin software server 160. In home environments, the cyber-protection device 400 can be managed from the owner that can install a lighter version of Admin software server 160

Admin software server 160 is in charge of updating cyber-protection device antivirus sub-module 552 signatures, Antispam sub-module 553 rules, content filter sub-module 554 rules, firewall rules 542, alert rules 544, software modules as well as cyber-protection device core software 800.

In case it would be necessary to interactively access the cyber-protection device 400 operating system 820 a reverse tunnel SSH can be started from the cyber-protection device Admin Mode Software 512 and control can be taken from a SSH client included in the Admin software server 160. This leads to two connections, one from the cyber-protection device 400 to the Admin software server 160 to establish the SSH tunnel, and the other from the Admin software server 160 to itself to enter the cyber-protection device 400 through the established SSH tunnel.

Both connections may be done with SSH protocol and open source software OpenSSH can be used to implement it. In both cases, connections must be authenticated by digital certificates. For that purpose, public keys from each system must be stored in the other party. That is, public key from the cyber-protection device 400 must be stored in the Remote Admin software server 160; and public key from the Admin software server 160 SSH client must be stored in the cyber-protection device 400.

While the cyber-protection device 400 is working in Admin Mode, Radio Threat Scanning module may be enabled in order prevent the user about over-the-air cyber-attacks.

In the preferred embodiment, the cyber-protection device 400 can also be used in Rescue Mode. This mode can be used if the user is far from any IT support service and any of the user mobile devices are broken or infected. Normally, in this cases the user would use a system rescue bootable device like a bootable pen drive, CD or DVD with rescue images to boot her broken device and repair it or disinfect it. If she is not able to do this, the cyber-protection device 400 can be used as Rescue device.

To use the cyber-protection device 400 in Rescue Mode, the user must initially download some ISO image from Remote Admin software server 160 while in Admin Mode. Later, she switches to Rescue Mode in which the cyber-protection device 400 boots with all scanning and network modules disabled but enabling USB OTG module to act as an USB storage bootable device. This bootable device can be a Windows or Linux rescue ISO image, or can be a bootable Antivirus that can off-line clean an infected machine.

What is claimed is:

1. A cyber-protection device comprising:
a mobile device including a housing box containing;
a touch screen acting as the only input and output for a user interface when is on a normal mode;
a multi-client wireless connection having a first wifi interface as a first access point for users acting as a wireless network gateway;
a second wifi interface acting to connect to a second access point for clients;
an intercepting mechanism for plain or encrypted wireless communications of a personal mobile device the intercepting mechanism for inspecting traffic;
a third wifi interface acting as a first sensor for detecting cyber-attack attempts over the wifi interfaces;
a rechargeable and portable battery system used as the only power source for the cyber-protection device;
a motherboard including a CPU with a software;
a memory system and device controllers capable of running unix-like operating systems;
a bluetooth interface acting as a second sensor to analyze a bluetooth band and detect the cyber-attack attempts;
a USB interface device for detecting malicious power chargers;
wherein the software includes;
a unix-like operating system;
a network stack implementation;
a network security engine having an alert engine, a malware detection engine, an intruder detection system, a graphical user interface (GUI), a firewall engine, an IPS/IDS engine, a content filtering engine, and a DPI engine;
a sound system to trigger an audible alarm;
wherein when the cyber-attack is detected by the third wifi interface or the bluetooth interface, or the malware detection engine, or the IDS/IPS engine, or the DPI engine, the security network engine uses a security network rule set to filter, block, or bypass a network traffic to and from the personal mobile devices by using a security network rule set;
wherein the portable cyber-protection device does not require the installation of special software on the personal mobile device to be protected.

2. The wireless cyber-protection system of claim 1, wherein the bluetooth sensor is an IEEE 802.15.4 Zigbee interface or an IEEE 802.15.6 BAN interface.

3. The wireless cyber-protection system of claim 1, further comprising a remote update service for receiving security rule sets and software updates through a connection to a central management server.

4. The wireless cyber-protection system of claim 1, wherein the system is free of an ethernet interface, JTAG interface, interface that provide direct access to a core of the system, a TCP/IP or a UDP/IP remote listening device to minimize an own attack surface.

5. The personal portable cyber-protection device of claim 1, wherein the traffic between the first wifi interface and the second wifi interface are bridged so no IP addresses are assigned making them undiscoverable over an IP network.

6. The personal portable cyber-protection device of claim 1, wherein the cyber protection device further includes a digital fingerprint scanner to authenticate the user.

* * * * *